3,391,542
PROCESS FOR GROUTING WITH A TRI-
COMPONENT CHEMICAL GROUTING
COMPOSITION
Franklin W. Herrick and Rodney I. Brandstrom, Shelton,
Wash., assignors to Rayonier Incorporated, Shelton,
Wash., a corporation of Delaware
No Drawing. Filed May 17, 1965, Ser. No. 456,543
9 Claims. (Cl. 61—36)

ABSTRACT OF THE DISCLOSURE

A tricomponent chemical grouting composition is provided for the in situ stabilization of earth, sand and other porous, particulate formations of solids. It comprises an aqueous solution of a formaldehyde-reactive, water-soluble, alkaline polyphenolic derivative of coniferous bark or a tannin of the catechin or condensed type, formaldehyde and a soluble salt of chromium, iron or aluminum. In use, the three components, in carefully controlled proportions, are thoroughly mixed at ambient temperatures and injected into the porous formation to be grouted whereupon at a precalculated time they gel to form with the solids of the porous formation an in situ, stable, water-resistant grouted structure of substantial strength, rigidity and durability.

---

Cement and water mixtures have been used for many years to stabilize and strengthen earth and said formations and thereby increase their load-bearing capacity and seal-off water or liquid flows therein, etc. Cement-grouting as this process is called, however, has severe limitations in practice brought on by relatively slow setting and curing rates, difficulty in injection into earth formations and sensitivity to the environment during injection and setting. As a result in recent years the building and construction industries have been actively searching for a more flexible non-cement, chemical-grouting system to supplement and in many cases supplant cement-grouting procedures. Several non-cement chemical-grouting systems have been proposed such as the complex and relatively costly gel-system based on water-soluble acrylamide polymers and the use of various types of phenol-formaldehyde resins. So far, however, none of these proposed systems have met with much commercial success due to the stringent properties which such a system must possess. Among the more important of these properties are the following:

(a) The materials forming the grouting-system should be relatively inexpensive and in plentiful supply since most grouting jobs require large quantities of such materials.

(b) The grouting materials should be readily soluble in water at ambient temperatures forming non-corrosive solutions of relatively low viscosity in order to facilitate injection into earth and sand formations.

(c) The grouting system should consolidate the particulate solids of the earth, sand or other formation into a stable, rigid, water-resistant structure of substantial strength.

(d) The formation-time of the foregoing solid structure after injection of the grouting solution should be relatively short and fully controllable over a fairly board span of time to make possible accurate placement of the grouted structure within the earth, sand or other formation.

(e) The grouted structure, and grouting solution, both before and after injection and solidification should be relatively inert and nontoxic to avoid danger of injury to operating personnel and contamination of the area surrounding the grouted structure.

In the present invention we have discovered and developed a novel chemical-grouting composition that fulfills all of the foregoing requirements. Our invention provides a chemical-grouting composition that is relatively inexpensive to use, has a controllable wide range of solidification times ranging from a second or two to several hours after injection, is relatively non-toxic and non-corrosive at all times and provides grouted structures that are extremely strong, stable, water-resistant and capable of accurate placement.

The present invention comprises the discovery that a tri-component, chemical-grouting composition as a mixture of aqueous solutions of a formaldehyde-reactive, water-soluble, alkaline polyphenolic derivative of bark or a tannin of the catechin or condensed-type formaldehyde and a soluble salt of chromium, iron or aluminum will gel at ambient temperatures when injected into or mixed with porous formations of earth, sand or other particulate solids to form a stable, water-resistant structure therewith of great strength. It also comprises the further discovery that by careful control of the relative amount of the soluble salt of chromium, iron or aluminum present in said mixture, the gel-time (i.e., formation time of the solid phase of the grouted structure) can be accurately controlled and caused to take place over a period of from a second or two to several hours after injection as desired for effective placement of the same. It was surprising to find that a grouted structure, formed in the foregoing manner of relatively inert particulate solids and a gel, containing up to 75 percent water would be highly water-resistant and capable of sealing off substantial flows of water as well as having strengths approaching those of a cured-cement structure.

While pure phenols probably can be used to form the gel structures of the invention their relatively high cost rules them out in practical applications. Accordingly, in our invention the preferred polyphenolic materials are the alkaline extracts of certain coniferous tree barks or the neutral and alkaline catechin or condensed tannin extracts of quebracho, mangrove, mimosa and wattle. In every case, to be useful the polyphenolic material must be substantially soluble in alkaline aqueous solutions at ambient temperatures, have a formaldehyde reactivity of at least 5 as hereinafter defined and be capable of rapid gelation.

Suitable polyphenolic materials are obtained by the extraction of Western hemlock, Douglas fir, White fir, Sitka spruce and Southern yellow pine (*Pinus echinata, taeda, caribaea, elliotti* and *rigida* var. *serotina*) tree barks with aqueous solutions of sodium, ammonium and potassium hydroxides. Suitable extraction temperatures range from ambient to about 185° C. and extraction times from about 15 to 240 minutes depending upon the concentration of the alkali and other conditions used. Particularly useful polyphenolic materials can be prepared from barks by the methods of U.S. Patents Nos. 2,782,241, 2,819,295 and 2,823,223. When the polyphenolic material is a vegetable tannin rather than a bark extract, only catechin or condensed tannins such as those extracted from quebracho, mangrove, mimosa and wattle are usable. Gallo or hydrolyzable tannins such as those extracted from Chestnut, myrobalan and Divi-Divi are not as they cannot be gelled satisfactorily under grouting conditions. Utility of the tannins, just as with bark extracts, is based on a combination of formaldehyde reactivity, rapidity of gelation and solubility in alkaline solutions. Rate of gelation is an inherent property of the polyphenolic materials and depends upon it chemical constitution while the formaldehyde reactivity can be determined by the following test:

In a 500 ml. beaker, an accurately weighed sample (about 20 g.) of the bark material and approximately 300 ml. of water are well mixed. The pH of the solution is adjusted to 9.5 by adding dropwise 5–10% sodium hydroxide or hydrochloric acid as required. The solution is then washed into a 500 ml. volumetric flask and 25 ml. of 37% formaldehyde is added. Water is then added to make 500 ml.

A blank determination is made by adding 25 ml. of 37% formaldehyde to a 500 ml. volumetric flask and diluting to volume with water. Five ml. of this solution is added to 50 ml. of water and 10 ml. of 10% sodium sulfite solution. This solution is titrated to pH 9.5 with 0.1 N hydrochloric acid. The reaction is as follows:

$$CH_2O + Na_2SO_3 + H_2O \rightarrow CH_2O \cdot NaHSO_3 + NaOH$$

From this titration is calculated the initial formaldehyde concentration.

After four hours a 5 ml. sample of the original solution is withdrawn, diluted with 50 ml. of water and adjusted to pH 7 with 0.1 N hydrochloric acid. To this solution is added 10 ml. of 10% soduim sulfite solution and it is then titrated with 0.1 N hydrochloric acid to pH 9.5. From this value is calculated the amount of formaldehyde remaining after four hours.

The formaldehyde which has condensed with the bark is determined by subtracting the formaldehyde found in the four hour sample from that found in the blank. This is expressed as grams of formaldehyde per 100 g. of dry, ash free bark material.

The above method of determining formaldehyde was described by Lemme, Chem. Ztg. 27, 896 (1903).

The following table lists the formaldehyde reactivity of alkaline bark extracts:

| Species | Formaldehyde Reactivities | |
| --- | --- | --- |
|  | NaOH Extract | NH₃ Extract |
| Western hemlock | 8.4 | 7.4 |
| Douglas fir | 6.4 | 6.6 |
| Sitka spruce | 6.0 | 7.4 |
| White fir | 6.6 | 5.3 |
| Southern yellow pine | 6.0 | 7.5 |

In the practice of the invention, a suitable polyphenolic material is dispersed in sufficient water to form a 15–40 percent solution by weight and the pH is adjusted to a pH between 7 and 12 (preferably between 9 and 11) with caustic or equivalent alkali as needed. The amount of alkali required for this purpose (if any) will vary widely with the polyphenolic material used. Alkali bark extracts, for example, are normally prepared to contain about 20 percent caustic and consequently seldom require any additional to put them in the proper range. Tannin extracts on the other hand are frequently on the acid side and will require as much as 20 to 25 percent of their weight of the caustic before they will dissolve completely and attain the desired pH. Solution temperature should be ambient (preferably between about 15 and 30° C.) but is not particularly critical. If proper adjustments are made temperatures somewhat outside this range can be used.

In order to gel the foregoing alkaline polyphenolic solutions in a given soil-formation at a desired place and within a desired time, from 1 to 10 percent formaldehyde on the weight of the polyphenolic material and a carefully controlled amount of a metal ion of the group consisting of chromium, iron and aluminum are added at the time of injection. They can be added separately as aqueous solutions or the metal ion (in the form of a soluble salt) can be dissolved in the formaldehyde solution ahead of time and the two added simultaneously. In either case rapid and thorough mixing of the three-component mixture just prior to or during injection is required to prevent topical supersaturation of the metal ion in the solution and its precipitation as an alkali insoluble hydroxide.

In soil-grouting operations accurate close control of the length of time between mixing of the grouting solution, its injection into the formation and the gelation time is of vital importance to insure proper placement of the grouting mixture in the formation for maximum utility. This timing is accomplished primarily by control of the amount of the catalytic metal ion that is added. The more metal ion that is added the faster the reaction. We have found that gelation time can be varied at will from a few seconds to as long as several hours by varying the amount of metal ion added within the range of about 0.1 to 5 percent based on the dry weight of the polyphenolic material in the grouting solution at the time of injection. (For most operations the range will be about 0.5 to 2.0 percent.) In addition to increasing the rate of gelation we have also found that early gel strengths and grounter structure strengths which are directly related thereto increase proportionately as the amount of metal ion that is added but that ultimate strength are not perceptibly affected. Excessive amounts of catalyst, however, must be avoided. They not only shorten gel time below useful limits but also have an adverse effect on the ultimate strengths.

Formaldehyde, the third necessary component of the soil-grouting mixture at the time of injection should be present in an amount sufficient to insolubilize the polyphenolic material in the solution with a little excess as a safety factor. This will require from about 1 to 10 percent based on the weight of the polyphenolic material with the preferred range for most operations lying within about 2 to 5 percent. Large excesses should be avoided as they are expensive, unnecessarily dilute the gels as formed and often present a serious odor problem.

The following examples illustrate the invention in more detail.

EXAMPLE 1

This example demonstrates how gel time and early gel strengths and consequently grouted structure strength can be controllably accelerated by the addition of increasing amounts of chromium ion to freshly prepared alkaline polyphenol-formaldehyde reaction mixtures.

Two typical alkaline bark extracts of polyphenolic material having a formaldehyde reactivity in excess of 5 were prepared from hogged Western hemlock bark in the following ways.

Sample A.—An autoclave equipped with a mechanical agitator was charged with hogged bark, anhydrous ammonia and water in a ratio corresponding to 100 parts dry bark, 10 parts anhydrous ammonia and sufficient water to make a total charge of 670 parts. The autoclave was sealed and heated rapidly with agitation to 150° C. and held at that temperature for 30 minutes. It was then opened and discharged onto a 200 mesh screen and the solid residue pressed. On analysis the product solution was found to contain 26.4 parts of dissolved solids. A solution containing 5.28 parts of sodium hydroxide (20 percent on the weight of dissolved bark extract solids) was added, the mixture vacuum concentrated to 25 percent solids content and then spray dried to form a fine, dark colored, free-flowing powder in a gross yield of 31.7 parts based on the weight of the bark used.

Sample B.—An autoclave equipped with mechanical agitator was charged with hogged bark, caustic soda and water in a ratio corresponding to 100 parts dry bark, 9 parts caustic soda and sufficient water to make a total charge of 530 parts. The charge was heated rapidly to 100° C. with stirring and held at this temperature for 30 minutes and then discharged onto a 40 by 60 mesh screen and the solid residue pressed. The extract solution was clarified, concentrated to about 30 percent total solids by evaporation and spray-dried. A dark colored, water-soluble powder of alkaline polyphenolic material material was obtained in a gross yield of 37 percent based on the weight of the original bark.

Sample C.—This was a commercial sample of ordinary quebracho wood extract.

Sample D.—This was a commercial sample of mangrove bark tannin.

Aqueous solutions having a total solids content of 25 percent and a pH of 10 (adjusted with NaOH where necessary) were prepared from each of the foregoing polyphenolic Samples A–D. 10 percent (by weight) formaldehyde and varying amounts of chromium, iron and aluminum salt solution as indicated in Tables 1 and 2 were added to aliquots of the solutions and the mixtures stirred vigorously and thoroughly for 10 seconds. The formaldehyde used was a commercial 37 percent solution. The chromium salt was a 20 percent solution of $$Na_2CrO_7 \cdot 2H_2O$$

the iron a 20 percent solution of $FeSO_4 \cdot 7H_2O$ and the aluminum a 49 percent solution of $Al_2(SO_4)_3 \cdot 18H_2O$.

Each aliquot test sample was prepared in a container having a tight-fitting cover and following the mixing was tested at the indicated intervals for gel time and gel strengths. The gel time was arbitrarily taken as the elapsed time (from the addition of the metal ion and formaldehyde) whereupon the solution solidified to a point where it no longer would adhere to a glass rod plunged into it (i.e., had a viscosity exceeding 10,000 poises). A commercially available automatic gelation timing instrument of the plunger type was also used, particularly when determining the longer gel times. Gel strengths were measured using a Proctor-type penetrometer as designated in ASTM Test C-403-61T for testing the setting of concrete mixtures.

Gel time determinations are tabulated in Table 1 and gel strength determinations in Table 2.

TABLE 1.—GEL TIMES IN MINUTES

| Polyphenolic Material | Metal | Percent by weight of metal ion added to mixture | | | | | | |
|---|---|---|---|---|---|---|---|---|
| | | 0.00 | 0.56 | 1.12 | 1.68 | 2.23 | 3.35 | 3.91 |
| Samp. A | Chromium | 149 | 6 | 4 | 2 | 1.5 | 1 | 0.5 |
| Samp. B | do | 300 | 12 | 5 | 3 | 2.5 | 1 | 0.5 |
| Samp. C | do | 401 | 43 | 15 | 9 | 7 | 5 | 5 |
| Samp. D | do | 30 | 7 | 5 | 4 | 3 | 2.5 | 2 |
| | | 0.00 | 0.32 | 0.64 | 0.96 | 1.29 | 1.93 | 2.25 |
| Samp. A | Iron | 20 | 5 | 2 | 1 | 0.25 | 0.1 | |
| Samp. C | do | 156 | 87 | 48 | 33 | 20 | 14 | |
| | | 0.04 | 0.08 | 0.16 | 0.24 | | | |
| Samp. A | Aluminum | 13 | 2 | 0.25 | | | | |
| Samp. C | do | 78 | 53 | 37 | 12 | | | |

TABLE 2.—GEL STRENGTH IN P.S.I.

| Polyphenolic Material | Metal Ion | Percent | Penetrometer p.s.i. after hours at 25° C. | | | | |
|---|---|---|---|---|---|---|---|
| | | | 0.25 | 1 | 4 | 24 | 48 |
| Samp. A | Chromium | 0.00 | 0 | 0 | 0 | 11 | 125 |
| Samp. B | do | 0.00 | 0 | 0 | 0 | 18 | 3 |
| Samp. C | do | 0.00 | 0 | 0 | 0 | 140 | 250 |
| Samp. D | do | 0.00 | 0 | 130 | 280 | 510 | 520 |
| Samp. A | do | 1.12 | 13 | 48 | 80 | 101 | 180 |
| Samp. B | do | 1.12 | 11 | 37 | 62 | 98 | 160 |
| Samp. C | do | 1.12 | 0 | 37 | 380 | 440 | 500 |
| Samp. D | do | 1.12 | 56 | 320 | 470 | 530 | 530 |
| Samp. A | do | 1.68 | 24 | 62 | 90 | 160 | 200 |
| Samp. B | do | 1.68 | 14 | 55 | 88 | 150 | 150 |
| Samp. C | do | 1.68 | 55 | 280 | 380 | 460 | 480 |
| Samp. D | do | 1.68 | 220 | 430 | 480 | 550 | 560 |
| Samp. A | do | 2.23 | 29 | 64 | 75 | 170 | 210 |
| Samp. B | do | 2.23 | 28 | 63 | 90 | 150 | 150 |
| Samp. C | do | 2.23 | 100 | 350 | 450 | 540 | 600 |
| Samp. D | do | 2.23 | 420 | 470 | 470 | 480 | 470 |
| Samp. A | do | 3.35 | 39 | 60 | 56 | 84 | 190 |
| Samp. C | do | 3.35 | 170 | 540 | 540 | 520 | 690 |
| Samp. D | do | 3.35 | 460 | 480 | 480 | 420 | 520 |
| Samp. A | Iron | 0.64 | 0 | 12 | 30 | 64 | 100 |
| Samp. A | do | 0.96 | 0 | 25 | 52 | 74 | 140 |
| Samp. A | do | 1.29 | 0 | 31 | 43 | 56 | 190 |
| Samp. A | do | 1.93 | 0 | 15 | 17 | 22 | 21 |
| Samp. A | Aluminum | 0.04 | 0 | 0 | 9 | 24 | 40 |
| Samp. A | do | 0.08 | 6 | 13 | 27 | 52 | 72 |
| Samp. C | Iron | 0.64 | 0 | 0 | 32 | 360 | 540 |
| Samp. C | do | 0.96 | 0 | 5 | 45 | 410 | 660 |
| Samp. C | do | 1.29 | 0 | 14 | 65 | 420 | 660 |
| Samp. C | do | 1.93 | 0 | 29 | 97 | 360 | 450 |
| Samp. C | Aluminum | 0.04 | 0 | 0 | 56 | 250 | 470 |
| Samp. C | do | 0.08 | 0 | 5 | 75 | 370 | 580 |
| Samp. C | do | 0.16 | 0 | 5 | 65 | 330 | 450 |

EXAMPLE 2

Solutions of the bark extract "B" of Example 1 were prepared having a pH of 10, a temperature of 25° C., and a concentration of bark extract by weight of 20 to 40 percent. Aliquots of these solutions were gelled by treatment with 10 percent formaldehyde (by weight) and varying amount of chromium ion using the method of Example 1. The gel times and strength properties are recorded in Tables 3 and 4 and demonstrate the effect of polyphenol solution concentration.

TABLE 3.—CONCENTRATION OF BARK EXTRACT IN SOLUTION

| | 20% | | 25% | | 30% | | 40% | |
|---|---|---|---|---|---|---|---|---|
| Percent Metal Ion | Gel time, mins. | Percent Metal Ion | Gel time, mins. | Percent Metal Ion | Gel time, mins. | Percent Metal Ion | Gel time, mins. | |
| 0 | 928 | 0 | 300 | 0 | 96 | 0 | 16 | |
| 0.7 | 22 | 0.56 | 12 | 0.46 | 5 | 0.35 | 2 | |
| 1.4 | 10 | 1.12 | 5 | 0.93 | 3 | 0.70 | 1.5 | |
| 2.1 | 5 | 1.68 | 3 | 1.40 | 2 | 1.05 | 1 | |
| 2.9 | 3 | 2.23 | 2.5 | 1.86 | 1 | 1.40 | 0.5 | |

TABLE 4

| Polyphenol | | Metal Ion, percent | Penetrometer Gel Strengths in p.s.i. After hours | | | | |
|---|---|---|---|---|---|---|---|
| Conc., percent | Percent Vis. poises | | 0.25 | 1 | 4 | 24 | 48 |
| 20 | 0.4 | 0 | 0 | 0 | 0 | 0 | 6 |
| 20 | | 1.4 | 0 | 8 | 26 | 40 | 50 |
| 20 | | 2.1 | 5 | 19 | 32 | 44 | 54 |
| 20 | | 2.8 | 10 | 17 | 36 | 43 | 62 |
| 25 | 0.9 | 0 | 0 | 0 | 0 | 18 | 32 |
| 25 | | 1.12 | 11 | 37 | 62 | 98 | 160 |
| 25 | | 1.68 | 14 | 55 | 88 | 150 | 150 |
| 25 | | 2.23 | 28 | 63 | 90 | 150 | 140 |
| 30 | 2.5 | 0 | 0 | 0 | 4 | 70 | 72 |
| 30 | | 0.93 | 47 | 79 | 132 | 240 | 250 |
| 30 | | 1.40 | 65 | 116 | 220 | 240 | 190 |
| 30 | | 1.86 | 77 | 200 | 230 | 200 | 200 |
| 40 | 32 | 0 | 0 | 16 | 70 | 170 | 180 |
| 40 | | 0.70 | 103 | 200 | 345 | 645 | 635 |
| 40 | | 1.05 | 280 | 270 | 430 | 690 | 500 |
| 40 | | 1.40 | 290 | 590 | 600 | 625 | 600 |

There are at least three factors to be considered when selecting an optimum concentration of polyphenolic material for use in a grouting system. In grouting coarse aggregates such as gravel, voids in rock formations and where moving water is involved, higher viscosities such as 2.5 to 32 poises are advantageous. Such high viscosity grouting mixtures, however, cannot be pumped into finer formations such as clay soils without the use of excessively high pressures and therefore have little utility in such cases. The viscosity must be tailored to the grouting job to be done. Secondly, the cost of grouting obviously goes up with increasing polyphenolic material concentration in the grouting solution. At times this can be a critical factor especially on very large jobs. Thirdly, there is the problem of properly placing the grouting fluid in the formation before it gels when using the higher concentration. As shown in Table 3 for example, using a 40 percent concentration, gel time quickly gets down below a minute. With gel times that short it is often difficult to avoid pumping troubles.

One big advantage with increasing the concentration of polyphenolic material in the grouting solutions is the very sharp rise in strength that results. This, of course, is to be expected since there is correspondingly more chemical and less water in the solidified gel of the grouted formation.

EXAMPLE 3

As pointed out above the process of the present invention is always carried out on the alkaline side with the optimum pH being around 10, and the following example illustrates the effect of varying the pH.

Various polyphenolic materials differ in their solubility properties and alkalinity requirements for optimal reaction with formaldehyde. In general, alkaline bark extracts (as obtained in Example 1) are quite sensitive to pH and have optimal reactivity at about pH 10. Some tannins are more tolerant to pH changes in the range of 9 to 11, but may require appreciable amounts of alkali in order to yield solutions of appreciable concentration. For example a 40% solution of ordinary quebracho extract requires about 10 parts of sodium hydroxide per 100 parts of extract to be fully dissolved at room temperature whereas a 25% solution only required about 2.5 parts. However, even the 25% solution is optimally reactive when 5 to 10 parts of NaOH are present.

A 25% alkaline solution of quebracho extract was prepared using 2.5, 5, 10 and 20 parts of NaOH per 100 parts of quebracho on a dry basis. Samples of these solutions were then treated with formaldehyde and varying amounts of chromium ion by the methods of Example 1. Gel times and 48 hour gel strengths were determined and the results recorded in Table 5.

Similarly 25% solutions of the bark extract Sample A of Example 1 were prepared and the pH's adjusted to 9.5, 10.0 and 10.5 with NaOH. Grouting solutions were prepared therefrom using 5 percent formaldehyde on the weight of the polyphenolic material and Ferrous-ion as indicated in Table 6. Gel times and gel strengths were determined for these samples and recorded in Table 6.

TABLE 5.—EFFECT OF ALKALINITY ON THE GEL TIME AND STRENGTH OF ALKALINE QUEBRACHO EXTRACT-FORMALDEHYDE REACTION MIXTURES

| Parts NaOH | 2.5 | | 5 | | 10 | | 20 | |
|---|---|---|---|---|---|---|---|---|
| pH | 8.5 | | 9.3 | | 10.2 | | 11.4 | |
| | Gel Time in Mins. and Gel Strengths in p.s.i. at 25° C. | | | | | | | |
| | Gel Time | 48 hour Strength | Gel Time | 48 hour Strength | Gel Time | 48 hour Strength | Gel Time | 48 hour Strength |
| Chromium Ion, percent: | | | | | | | | |
| 0.00 | 686 | 28 | 198 | 180 | 250 | 115 | 1,737 | 15 |
| 0.56 | 216 | 48 | 150 | 270 | 103 | 195 | 251 | 60 |
| 1.12 | 41 | 71 | 30 | 575 | 31 | 400 | 88 | 380 |
| 1.66 | 5 | 72 | 6 | 650 | 11 | 465 | 75 | 450 |

TABLE 6.—EFFECT OF ALKALINITY ON THE GEL TIME AND STRENGTH OF ALKALINE BARK EXTRACT-FORMALDEHYDE REACTION MIXTURES

| pH | Ferrous Ion, Percent | Gel Time Minutes | Penetrometer gel strengths p.s.i. (25° C.) | | | | |
|---|---|---|---|---|---|---|---|
| | | | 0.25 hrs. | 1 hr. | 4 hrs. | 24 hrs. | 48 hrs. |
| 9.5 | 0.00 | 37 | 0 | 6 | 6 | 25 | 45 |
| 9.5 | 0.64 | 2 | 9 | 22 | 42 | 76 | 78 |
| 9.5 | 0.96 | 0.75 | 16 | 28 | 48 | 78 | 76 |
| 9.5 | 1.27 | 0.5 | 17 | 28 | 41 | 62 | 63 |
| 10.0 | 0.00 | 121 | 0 | 0 | 0 | 18 | 24 |
| 10.0 | 0.64 | 8 | 0 | 10 | 29 | 72 | 110 |
| 10.0 | 0.96 | 3 | 6 | 26 | 49 | 170 | 195 |
| 10.0 | 1.27 | 2 | 18 | 30 | 49 | 170 | 190 |
| 10.5 | 0.00 | 130 | 0 | 0 | 0 | 14 | 28 |
| 10.5 | 0.64 | 14 | 0 | 0 | 17 | 59 | 70 |
| 10.5 | 0.96 | 7 | 0 | 10 | 31 | 76 | 941 |
| 10.5 | 1.27 | 4 | 3 | 24 | 48 | 84 | 91 |

EXAMPLE 4

Formaldehyde is one of the three main components of the grouting system of the present invention. The following example illustrates its effect on gel time, gel strength and the water resistance of the gels.

A 25 percent solution of the quebracho extract (Sample C, Example 1) having a pH of 10.0 was prepared. Its viscosity was 0.9 poises at 25° C. Aliquots of this solution were treated with 1.66% chromium ion and varying amounts of formaldehyde corresponding to 1 to 10% formaldehyde on the weight of the polyphenolic material as indicated in the following tables. After mixing for 10 seconds as before the reaction mixtures were either used in gel time determinations or were injected into fine sand to obtain saturated grouted sand specimens for testing.

The procedure used in pressure grouting was as follows. The bottom of a standard plastic container was drilled with several small holes and fitted with a fine filter paper. A standard grade of fine plaster sand screened to obtain a 30 to 50 mesh fraction, was then added to the plastic container in an amount approximately 3 times that of the grouting solution to be added. The plastic container was then placed in a tight fitting retainer in a pressure filtration cell. The grouting solution was then poured on top of the sand and the cell was immediately closed and air pressure at 150 p.s.i. was applied. A throttle valve at the bottom of the cell was opened briefly to allow internal air to escape and then closed to provide the back pressure to fully saturate the sand prior to solidification of the grout solution. Samples prepared in this manner were tested for load bearing strength by use of the previously described penetrometer test (ASTM C-403-61T). The results obtained are presented in Table 7.

A water resistance test was devised as a means of determining the resistance of the gel structure to swelling, dissolution and other failures in the presence of excess water at 25° C. In this test, samples of gels that had been aged for 48 hours in sealed containers were carefully removed, weighed, and immersed in at least 10 volumes of water for five days. At the end of this time, loss or gain in weight was determined as were gel or grouted strengths using the same penetrometer test. The percent of the 48 hour strength retained after the soaking was judged to be the most significant estimate of water resistance. Some pertinent water resistance values are included in Table 7.

TABLE 8.—GROUTING OF SAND AND FINE GRAVEL STRUCTURE USING A CATALYZED ALKALINE POLYPHENOL-FORMALDEHYDE REACTION MIXTURE

| Age of Sample When Tested Minutes | Penetrometer Strength in p.s.i. | | | |
|---|---|---|---|---|
| | Very fine field sand | Commercial Plaster sand | Graded sand 30-50 mesh | Fine Gravel 8-16 mesh |
| 15 | 820 | 810 | 690 | 580 |
| 30 | 580 | 1,155 | 860 | 830 |
| 60 | 1,390 | 1,110 | 850 | 945 |
| 240 | 1,760 | 1,340 | 1,440 | 1,060 |
| 1,440 | 2,320 | 1,620 | 1,470 | 1,620 |

TABLE 9.—GROUTING OF FINE FIELD SAND USING A 20% TOTAL SOLIDS CATALYZED ALKALINE POLYPHENOL-FORMALDEHYDE REACTION MIXTURE

| Age of Sample When Tested | Penetrometer Strength in p.s.i. |
|---|---|
| 15 minutes | 485 |
| 30 minutes | 785 |
| 1 hour | 1,395 |
| 4 hours | 1,695 |
| 24 hours | 1,379 |
| 24 hours | 1,420 |
| 24 hours | 1,165 |
| 24 hours | 1,475 |
| 24 hours | 1,455 |
| Avg. 24 hours | 1,379 |
| 5 days soak in water at 25° C | 1,195 |

TABLE 7

| Formaldehyde Concentration percent of wt. basis | Gel Time, Mins. | Penetrometer strength of grouted sand p.s.i. after hours at 15° C. | | | | | Water Resistance p.s.i. after percent of 48 hr. soak strength | |
|---|---|---|---|---|---|---|---|---|
| | | 0.25 | 1 | 4 | 24 | 48 | | |
| 10 | 13 | 675 | 2,000 | 2,400 | 2,900 | 2,610 | 1,900 | 73 |
| 5 | 16 | 250 | 1,245 | 1,480 | 2,040 | 2,680 | 1,985 | 74 |
| 2.5 | 20 | 255 | 470 | 570 | 1,290 | 1,545 | 1,730 | 100 |
| 1.0 | 30 | 100 | 305 | 320 | 840 | 940 | 280 | 30 |
| 0.0 | (1) | | | | | | | |

[1] No gel.

NOTE.—All the samples containing formaldehyde were intact after soaking but those containing only 1.0 percent had absorbed sufficient water that their strengths were seriously impaired. Those without formaldehyde disintegrated.

EXAMPLE 5

This example illustrates further the utility of the grouting material in actual use.

Bark extract B of Example 1 was used as a 25% solution at pH 10 as the polyphenolic component of the grouting solution. The viscosity of the solution was 1.0 poises at 25° C. The second component was prepared by mixing 7 parts of 37% formaldehyde solution with 6 parts of 20% $Na_2Cr_2O_7 \cdot 2H_2O$ for every 100 parts of the polyphenol solution to be treated. The catalyst-formaldehyde mixture was found to be stable at room temperature for several hours and did not appreciably affect results if stored for two days.

Five grades of sand gravel material varying from very fine field sand to fine gravel were used to determine the degree to which the above grouting solution would penetrate when catalyzed to solidify in 2 to 3 minutes. The field sand contained 50% of material of a particle size from 50 to 100 mesh, 30% in the 150-250 mesh size and 11% material smaller than 250 mesh. The plaster sand contained a predominant 50-100 mesh fraction and 10% of material of a coarser mesh. Other materials are identified by screen mesh size ranges. These materials were pressure grouted as described in Example 4. The results are presented in Table 8.

A second sample of Bark extract B of Example 1 was prepared as a 20% solution at a pH of 10 and treated with 2.5 parts of formaldehyde and 2.1 parts of chromium ion per 100 parts of alkaline bark extract. The viscosity of this solution was 0.4 poises and the gel time 6 minutes at 25° C. Fine field sand was grouted with this solution as described above. A sample of this grouted gel submitted to the previously described 5 day water soaking test was only slightly affected by the treatment and had gained about 6% in weight by absorption of water but still retained 87% of the average strength showed at 24 hours as recorded in Table 9.

EXAMPLE 6

One of the advantages of the present grouting system is that the grouted formation continues to increase in strength for a long time. This is shown by the following example. For most purposes in the field the grouted formation should have a strength corresponding to at least 15 p.s.i. for the neat gel component therein.

A 25% solution of the bark extract Sample B of Example 1 was used under the reaction conditions of Example 2 and gave the results recorded in Table 10 below when gel strengths were determined after periods extended up to 240 days.

TABLE 10.—EFFECT OF AGING ON THE GEL STRENGTH OF ALKALINE POLYPHENOL-FORMALDEHYDE REACTION MIXTURES

| Percent Cr. ion based on weight of polyphenolic material | 0.00 | 0.56 | 1.12 | 1.68 | 2.20 |
|---|---|---|---|---|---|
| Gel Time, Mins. | 300 | 12 | 5 | 3 | 2.5 |
| Penetrometer Gel Strength, p.s.i.: | | | | | |
| after 15 mins | 0 | 0 | 11 | 14 | 28 |
| after 1 hour | 0 | 9 | 37 | 55 | 63 |
| after 4 hours | 0 | 19 | 62 | 88 | 90 |
| after 24 hours | 18 | 56 | 98 | 150 | 150 |
| after 48 hours | 32 | 76 | 160 | 150 | 140 |
| after 30 days | 130 | 220 | 210 | 200 | 200 |
| after 120 days | 260 | 295 | 270 | 270 | 250 |
| after 240 days | 290 | 340 | 340 | 340 | 290 |

EXAMPLE 7

A six-foot diameter tunnel was driven through a strata of water-flooded coarse sand and gravel in Brunswick County, N.J., at a depth of 16 feet. The formation was grouted with a composition of the invention. The water-table was approximately two feet from the surface, tunneling in this strata was not feasible without grouting and because of the condition of the strata cement-grouting could not be used. The grouting mixture used was composed of an alkaline derivative of hemlock bark prepared by the process of B, Example 1 (also see U.S. 2,782,241), formaldehyde and sodium dichromate dihydrate catalyst. Equipment used for preparation and injection of the grouting mixture was standard as developed for cement-grouting.

The grouting mixture was prepared as two solutions, one consisting of the polyphenolic material dissolved in water and the other an aqueous solution of catalyst-formaldehyde which were mixed together in the proper ratio at the time of injection. The injection itself was made through the usual grouting lance in a pattern of 3 foot centers over the area to be excavated at the desired depths, the whole being based on a 30-second gel-time sequence for the grouting material.

The components of the grouting mixture were prepared as follows:

(a) The bark extract (polyphenolic derivative) was dissolved in cold water at the rate of 100 pounds of the dry powder per 41 gallons of water to form an alkaline solution with a solids content of 21.5 percent.

(b) The catalyst-formaldehyde solutions was prepared by dissolving sodium dichromate dihydrate in cold water at the rate of 17 pounds per 100 gallons of water and adding 37 percent commercial formaldehyde solution thereto at the rate of 1 to 1.5 gallons.

The foregoing solutions when mixed in the grouting equipment at the time of injection at the rate of 100 gallons of the polyphenols solution to 10 gallons of the catalyst-formaldehyde solution gave an injected gel-time of approximately 30 seconds in the given strata. Back pressure developed almost immediately indicating efficient displacement of water from the strata and penetration. Then within 30 minutes of the injection the grouted formation became sufficiently stabilized that excavation without bulkheading and without water seepage could be carried on thus permitting a rapid continuous alternation of injection and excavation operations. Neat gel strengths of the gel that extruded from the formation were observed to have strengths of 120 p.s.i. within 48 hours, and grouted structure strengths for the grouted strata exceeded 700 p.s.i. (the upper limit of the field test penetrometer) in every case. In contrast to the foregoing results cement-grouting could not be used in this strata. Curing times of cement-grouted structures where utilized exceed several days from the time of injection and even then bulkheading is necessary and water-seepage is a problem.

In the foregoing tables where the percentages of metals are listed, it is to be understood that these represent the contained metals of the salts and the metal ions are effective because of the dissociation of the salts and the ionic state of the metals.

The gel-forming compositions of the invention may be used to form stable systems with various solid and liquid waste materials such as nuclear waste products, filtration media, and like materials.

We claim:

1. The improved process for producing a grouted structure which comprises distributing an alkaline aqueous gel-forming grouting composition in a mass of solid particulate material, said alkaline aqueous gel-forming grouting composition consisting essentially of a mixture of vegetative polyphenolic material of the group consisting of catechin type and condensed tannins and alkaline extracts of a coniferous tree bark that are substantially soluble in alkaline aqueous solutions at ambient temperatures, have a formaldehyde reactivity of at least 5 and are capable of rapid gelation, said polyphenolic material being dispersed in sufficient water to form a 15 to 40% solution by weight; from 1 to 10 weight percent of formaldehyde based on the weight of the dry polyphenolic material; and a catalyst of the group consisting of water-soluble salts of chromium, iron and aluminum to catalyze the gel-forming reaction, the amount of the contained metal ion of said salt being within the range of from 0.1 to 5% based on the dry weight of the solid polyphenolic material; the components of said composition being rapidly and thoroughly mixed together.

2. The process of claim 1 in which the polyphenolic material is an alkaline bark extract of a coniferous tree of the group consisting of Western hemlock, Douglas fir, Sitka spruce, White fir and Southern yellow pine, said alkaline bark extract having been prepared by digesting the bark in an aqueous alkaline solution, and separating the solution of alkaline bark extract.

3. The process of claim 1 in which the polyphenolic material is a tannin extract of the group consisting of quebracho, mangrove, mimosa and wattle in alkaline solution.

4. The process of claim 1 in which the contained metal of the salt varies from 0.5 to 2% based on the dry weight of the solid polyphenolic material, the amount of metal ion being selected to regulate the rate of gelation.

5. The improved soil-grouting process which comprises injecting into soil to be stabilized or strengthened an aqueous gel-forming alkaline composition consisting essentially of a mixture of polyphenolic material of the group consisting of a catechin tannin and an alkaline extract of a coniferous bark dispersed in sufficient water to form a 15 to 40% solution by weight, said polyphenolic material having a formaldehyde reactivity of at least 5%, being substantially soluble in alkaline aqueous solutions at ambient temperatures and being capable of rapid gelation; from 1 to 10% of formaldehyde based on the weight of the dry polyphenolic material; and a salt which provides in the composition an ion of a metal of the group consisting of chromium, iron and aluminum, and mixtures thereof, to catalyze the gel-forming reaction, the amount of said metal ion in said composition being within the range of from 0.1 to 5% based on the dry weight of the solid polyphenolic material; said composition being intimately mixed before injecting it into the soil, said metal ion being proportioned to effect the gelation rate.

6. The process of claim 5 in which the polyphenolic material is a tannin of the group consisting of quebracho, mangrove, mimosa and wattle.

7. The process of claim 5 in which the polyphenolic material is an alkaline extract of a coniferous bark of the group consisting of Western hemlock, Sitka spruce, White fir, Douglas fir, and Southern pine.

8. The process of claim 5 in which the contained metal of the salt varies from 0.5 to 2% based on the dry weight of the polyphenolic material.

9. The process for preparing a gel in association with solid particles which comprises: intermixing a polyphenolic material of vegetative origin with a sufficient amount of water to form a 15 to 40% solution by weight, said polyphenolic material being substantially soluble in alkaline aqueous solutions, having a formaldehyde reactivity of at least 5 at a pH of about 10 and being capable of rapid gelation; intermixing with said solution from 1 to 10 weight percent of formaldehyde based on the weight of the dry polyphenolic material and from 0.1 to 5 weight percent of a metal ion of the group consisting of chromium, iron and aluminum based on the weight of the dry polyphenolic material, said metal ion catalyzing the reaction of the gel-forming composition, said metal being selected in such an amount as to control the gelation rate at ambient temperature, and water in such an amount that it is the major component of the resulting gel; and promptly before any appreciable reaction results, injecting the intermixed components into a solid particulate material to form a stable gel structure.

(References on following page)

References Cited

UNITED STATES PATENTS

| | | |
|---|---|---|
| 2,527,581 | 10/1950 | Searer et al. |
| 2,934,511 | 4/1960 | Auerbach et al. _____ 260—38 |
| 3,177,163 | 4/1965 | McCully. |

OTHER REFERENCES

Lambe et al., "Altering Soil Properties With Chemicals," Chemical and Engineering News, vol. 32, No. 6, Feb. 8, 1954, pp. 488–492.

ALLAN LIEBERMAN, *Primary Examiner.*

UNITED STATES PATENT OFFICE
CERTIFICATE OF CORRECTION

Patent No. 3,391,542    July 9, 1968
Franklin W. Herrick et al.

It is certified that error appears in the above identified patent and that said Letters Patent are hereby corrected as shown below:

Column 3, line 16, "it" should read -- its --. Column 5, line 32, cancel "material", second occurrence. Column 6, TABLE 2, eighth column, line 1 thereof, "125" should read -- 15 --; same table, eighth column, line 2 thereof, "3" should read -- 32 --. Columns 9 and 10, TABLE 7, in the heading, line 2 thereof, "15° C." should read -- 25° C. --. Column 10, TABLE 10, third column, line 6 thereof, "220" should read -- 200 --; same table, fifth column, line 7 thereof, "270" should read -- 260 --. Column 11, line 26, "solutions" should read -- solution --; line 33, "polyphenols" should read -- polyphenolic --.

Signed and sealed this 2nd day of December 1969.

(SEAL)

Attest:

Edward M. Fletcher, Jr.

Attesting Officer

WILLIAM E. SCHUYLER, JR.

Commissioner of Patents